United States Patent [19]

Mullen

[11] 4,120,220
[45] Oct. 17, 1978

[54] GLASS CUTTER APPARATUS

[76] Inventor: Wayne C. Mullen, 3291 Vivian Dr., Wheatridge, Colo. 80033

[21] Appl. No.: 759,296

[22] Filed: Jan. 14, 1977

[51] Int. Cl.² .................. B26D 3/08; C03B 33/00
[52] U.S. Cl. ............................ 83/886; 83/648; 33/27 R; 33/32 E
[58] Field of Search .................. 33/27 R, 27 J, 27 K, 33/32 B, 32 C, 32 E, 32 G, 174 B; 83/12, 6, 7, 8, 520, 648

[56] References Cited

U.S. PATENT DOCUMENTS

| 453,867 | 6/1891 | Monee | 33/32 C |
|---|---|---|---|
| 1,511,016 | 10/1924 | Barker | 33/32 C |
| 2,862,302 | 12/1958 | Lucia | 33/174 B X |
| 3,532,018 | 10/1970 | Szabo | 83/520 X |
| 3,800,639 | 4/1974 | Restel | 83/12 X |
| 3,880,029 | 4/1975 | Bonaddio | 83/520 X |
| 3,903,767 | 9/1975 | Kupersmith | 83/7 |

Primary Examiner—J. M. Meisten
Attorney, Agent, or Firm—Richard D. Law

[57] ABSTRACT

Glass cutter (or scoring) apparatus for hand usage adapted to facilitate a preferred cutting procedure wherein the glass to be cut is itself moved with respect to a stationary cutter or stylus to provide a desired score line. A glass cutter that may have a cutter wheel or stylus is supported above a glass receiving table by a cutter support arm that extends forwardly from a fulcrum support. A force that may be adjusted is applied to the arm to hold the cutter engaged with the glass, and the glass is then moved in a hand guided or mechanically guided pattern to score the glass. Guide fence and pivot elements are provided for non-freehand specialty uses. The cutter may be moved to adjusted positions of varied distance and angularity to facilitate operations, and in one preferred embodiment the cutter support arm itself may be moved reciprocally to facilitate conventional glass cutting procedures wherein the cutter is moved with respect to the glass being cut. In connection with the preferred cutting procedures, both of the user's hands may be used to guide the glass being cut, and, accordingly, glass pieces of intricate and accurate shapes of the type being used in stained and art glass work may be efficiently cut. To facilitate usage of the device in connection with stained or art glass projects, patterns are provided on adhesive backed paper or film with segments of the pattern or of an obverse presentation thereof being applied to the glass that is to be cut whereby the placement of score lines is accurately controllable.

18 Claims, 8 Drawing Figures

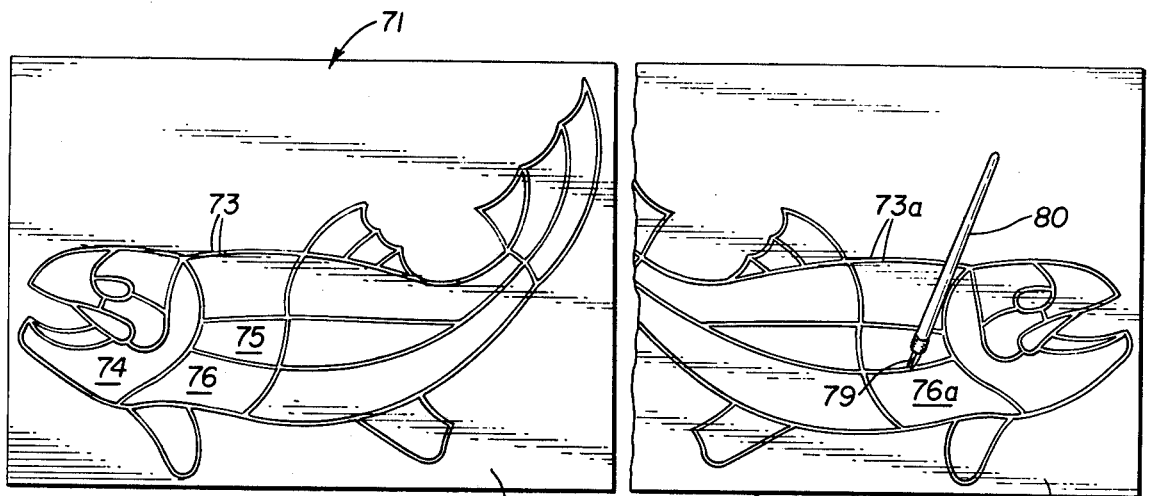
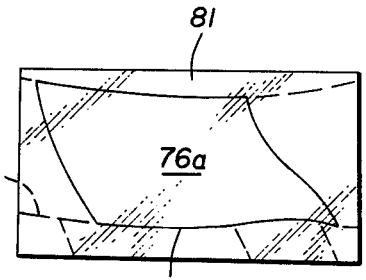
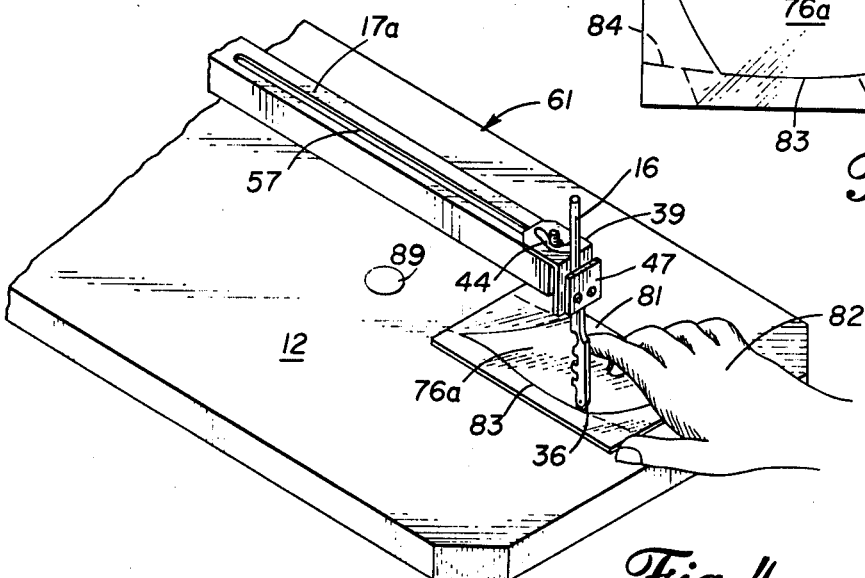

GLASS CUTTER APPARATUS

BACKGROUND OF THE INVENTION

At the present time there is a resurgence in the fields of stained and art glass work, and many people that may have little or no previous experience with the use of glass cutters are interested in accomplishing projects in the flat glass medium. The techniques employed by artisans that are familiar with the use of conventional type glass cutters are not easily developed, and, accordingly, inexperienced workers have difficulty in cutting glass to provide the intricate shapes that may be required. When the sheets of glass being used have a mottled or irregular surface, the problem is greater. In most all prior art glass cutting apparatus, a cutter or stylus is moved across the face of the glass that is to be scored. Hand tools previously used and provided are likewise intended and primarily adapted for use in keeping with this conventional cutting procedure. In keeping with the present invention, apparatus is provided which makes an inversion of said conventional glass cutting technique advantageous. In keeping with the alternate cutting procedure, the glass is now moved past a mechanically held and loaded cutter.

SUMMARY OF THE INVENTION

New glass cutting techniques are facilitated through provision of separate embodiments for glass cutting apparatus devices and through provision of patterns, the segment sections of which may be adhesively applied to the front or reverse faces of art and stained glass pieces that are to be cut. In the device embodiments a glass cutter is supported by a cantilevered support arm with provision being made for the adjustment of the force that is to be exerted on the cutter and, accordingly, on the glass itself. Since the cutter is held in relatively fixed position, both hands of the user may be applied to the glass to move the glass in a coordinated manner as necessary to score a cutting line that may be of intricate shape. Since both hands are used, the positioning and shape of score lines can be accurately controlled to closely follow guide lines provided on the glass. The placement of guide lines is itself closely controlled through provision of patterns that are printed in direct and/or obverse representations on adhesive backed paper or film. Segments of such pattern can then be applied to separate pieces of glass, and a score line can be cut along the guide line edge of the pattern, or, where wheel cutters are used and where the pattern is of thin film material, a score line can actually be cut directly through line representations on the pattern. Since stained glass is of relatively smoother texture on a reverse side, an obverse pattern is provided for application to the reverse side, and the glass is scored on the reverse side.

BRIEF DESCRIPTION OF THE DRAWINGS

FIG. 4 is a perspective drawing showing use of an alternate embodiment of the apparatus, FIG. 5 is a layout pattern representative of designs that may be accomplished through use of said apparatus, FIG. 6 is an obverse representation of said pattern, FIG. 7 is a side elevation of the pattern presentation, and FIG. 8 shows a cutout segment of said obverse pattern applied to the back of a glass piece for guidance in said cutting operations.

DESCRIPTION OF THE PREFERRED EMBODIMENTS

Figure 1:
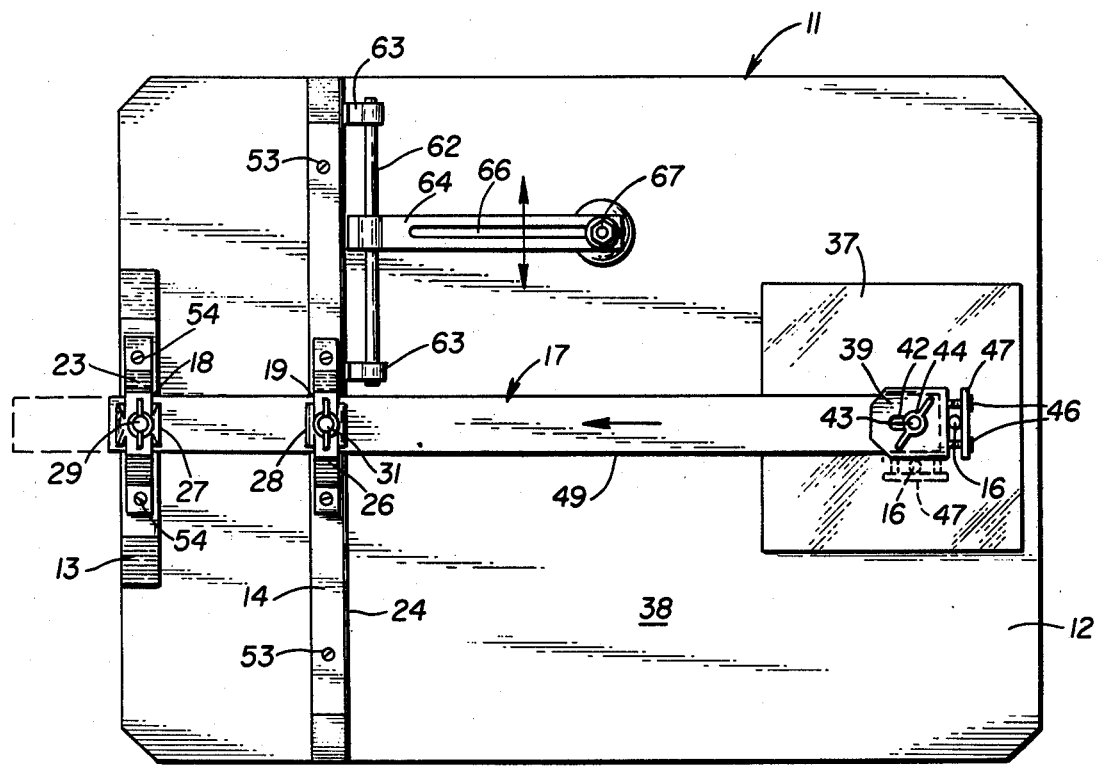
FIG. 1 is a top elevation showing a preferred embodiment of the invention.

A first apparatus presentation of this invention provides a glass cutting device 11. The cutting device or tool includes a table component or base 12 providing an upstanding fulcrum support 13 and a guide fence 14. A glass cutter 16 is applied to the end of a forwardly extending support arm 17. The support arm is received in notches 18 and 19 recessed in the upper surface of the fulcrum 13 and guide fence 14, and it is, in this embodiment, adapted for reciprocal movement in said notches to adjusted positions so that the glass cutter 16 may be disposed at adjusted distances away from the inner or guide face 24 for the guide fence 14. A bracket 23 on top of the fulcrum 13 and a similar bracket 26 disposed on top of the guide fence 14 have downwardly depending legs 27 and 28 that extend toward contact with the reciprocally moving arm 17 to provide guidance therefor and to essentially restrain the arm for closely guided movement in the notches 18 and 19. Upper surfaces of the brackets 23 and 26 have threaded openings, and thumb screws 29 and 31 extend therethrough to selectively engage the cutter arm 17. When the thumb screw 29 is tightened against the upper surface 32 of the cutter arm 17, the positioning of the glass cutter 16 will be established. Thereafter the lever thumb screw 31 may be tightened to adjust the downward force exerted on the arm 17 and, accordingly, to adjust the contact pressure between the cutter wheel 36 of glass cutter 16 and any glass piece 37 disposed on the upper face 38 of the table 12. A spring 33 is interposed between the head of the lever thumb screw 31 and the top surface of the bracket 26 so that the chosen adjustment for the thumb screw 31 will be maintained as glass cutting operations proceed.

An adjustable mounting is provided for holding glass cutter 16 in position at the end of the cutter support arm 17. Such mounting includes an angle piece 39 with a downwardly depending leg 41. The top leg provides an elongated opening 42 through which a machine screw 43 extends. A thumb nut 44 is engaged to such screw, and, accordingly, minor adjustments in the longitudinal position of the mounting 39 may be conveniently made. Mounting screws 46 extend through the downwardly depending leg 41 to hold a plate 47 against the handle of a conventional glass cutter 16. Necessarily, additional changes in the contact force exerted on the cutter wheel 36 of the glass cutter 16 can be made by changing the relative position of the glass cutter with respect to the cutter arm 17 when the point of contact between the plate 47 and the glass cutter handle is changed. It should further be noted that the angular disposition of the glass cutter 16 and its cutter wheel 36 with respect to the top surface 38 of the table 12 can also be changed, since the mounting 39 may be moved to various angular positions with respect to the longitudinal axis of the cutter arm 17. The elongated opening 42 facilitates such angular change in position. This potential angular change is illustrated in the dotted outline representation of FIG. 1. In the full line representation of FIG. 1 the cutter wheel is aligned with the longitudinal axis of the cutter arm, and in the dotted outline representation thereof the cutter wheel 36 would be at right angles to said axis. For either of these positions at zero or ninety degrees the cutter wheel positioning can be accurately maintained since the downwardly depending leg 41 may be brought into direct contact with the end 48 of the cutter arm 17 or with either side face 49 of said cutter arm.

Figure 2:
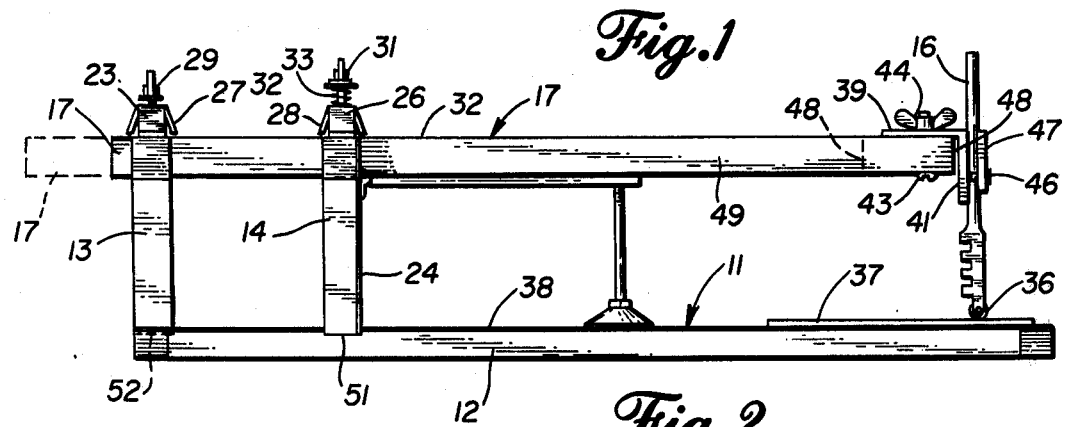
FIG. 2 is a side elevation of said embodiment.

Since the cutter arm 17 is reciprocally movable in its supports 13 and 14 and since such arm is at ninety degrees with respect to the guide face 24 of the guide fence 14, straight cross cuts may be made by the glass cutter 16 by simply reciprocating the cutter arm to alternate positions from a first to an alternate position as illustrated in FIG. 2. Similarly, straight rip cuts can be made through use of the glass cutter apparatus when the glass cutter 16 is moved to its alternate side position as shown in FIG. 1 with the cutter wheel 36 at an adjusted distance away from the guide face 24 of guide fence 14, and with the glass piece 37 being moved reciprocally along such guide face and beneath the cutter wheel.

Importantly, it should be noted that cuts or score lines may be made in the glass either by moving the glass cutter with respect to stationary pieces of glass, or alternately, and characteristicly of the prime use of such device, the glass itself may be moved with respect to the glass cutter. The second use in which the glass is moved with respect to the glass cutter is facilitated by the fact that the upper contact surface 38 of the table 12 and the guide face 24 of the guide fence 14 preferably have hard and durable low friction surfaces. Such low friction surface can be provided by the material of the table 12 and guide fence 14 where materials of sufficient hardness and smooth finish are used. For the more economical construction illustrated, the contact face of the basic materials providing the table 12 and guide fence 14 are covered by a separate facing material of sufficient hardness, smoothness and durability to resist scratching by the quite sharp edges of cut glass. Contact surfaces of plastics, such as polycarbonate, or of melamine, such as the melamine facing material made and sold under the trademark Formica, may be used. Such surfaces provide a smooth low friction contact face and make it easy to move the glass with respect to the glass cutter 16.

In order to assure a right angle disposition for the guide face 24 with respect to the cutter arm 17, the table 12 is desirably rabbeted at 51 and 52 to receive the guide fence 14 and the fulcrum support 13. When such rabbets and the notches 18 and 19 are machine cut, the assembly of the glass cutting apparatus is facilitated. Separate mounting screws 53 disposed in predrilled openings may be used to hold the table and guide fence in assembled relationship, or the bracket mounting screws 54 may be extended into the base 12. While the base, guide fence, and fulcrum 13 may be glued in place when assembled, it is recognized that packaging and shipment of the cutter device 11 may be facilitated if the components thereof could be handled and shipped in disassembled relationship. If the device is to be shipped and sold as a flat package unit, the mounting screws 53 or 54 can be applied through the upstanding parts 13 and 14 and through the base 12 to be engaged by mating fasteners, such as T nuts, wing nuts or the like (not shown). Where disengageable fasteners are used, the subsequent storage of the device by the user may also be facilitated.

An alternate arrangement for a cutting arm 17a is shown in the partial perspective representation of FIG. 4. Here an elongated slot 57 is provided by the arm 17a along which the glass cutter mounting 39 may be reciprocally moved. With this arrangement the adjusted positionings of the glass cutter 16 are made by moving the cutter mounting reciprocally along arm 17a, which is in fixed position with respect to a guide fence 14 that is used. With this arrangement the relative angular disposition of the cutter wheel 36 is adjusted by loosening the mounting screws 46 and by turning the glass cutter 16 itself to adjusted angular positions. All other components of this alternate glass cutter apparatus embodiment 61 can be essentially the same as those previously set forth. As in the previous embodiment, a lever thumb screw component 31 will be provided so that the downward force exerted by the arm 17a on the cutter wheel may be adjusted. Pieces that are common to the alternate arrangements are numbered identically with respect to the previously described embodiment. One further feature of this embodiment is the provision of a light source 89 at a position that can be directly beneath the cutter wheel 36 of a repositioned cutter 16. An electrically powered light disposed beneath a cover glass that is flush with the table surface 38 provides added illumination of guide lines, such as the guide line 83, along which the glass is to be scored.

FIG. 4 is of further interest since it serves to illustrate the prime usage of glass cutter devices made in accordance with the present invention. Such prime usage entails a hand type of glass cutting operation in which the glass pieces that are to be cut are moved reciprocally or in straight or curved line patterns beneath then stationary cutter wheels 36 or other glass cutting and scoring elements. Since the glass cutter 16 is securely held by the cutter arm 17 or 17a and since the force exerted by the cutter wheel can be preadjusted, one or both hands of the apparatus user may be applied to the glass to hold and move the glass in the desired contour pattern. Use of devices made in accordance with this invention have shown this glass cutting procedure, which is facilitated through use of this apparatus, wherein the glass is moved with respect to the cutter is a significant improvement over prior glass cutting operations in which the glass cutter itself is held in the hands of the user for movement with respect to a then stationary piece of glass. The present apparatus devices are of special benefit when the people cutting the glass have not had long experience in the use of glass cutters. It is found that inexperienced users of glass cutters usually do not have the strength and control that is necessary to guide a glass cutter along a line of irregular contour. Tilting of a glass cutter and irregularly applied contact pressures often result in interruptions of the score line or even in breakage of the glass itself. Through use of the described apparatus, relatively novice type users can cut glass pieces of intricate pattern and shape.

Contour trimming of glass is often required in the making of stained glass and art glass objects. Accordingly, a prime use of the apparatus will be in connection with these activities. Since stained glass and art glass work is now gaining in popularity and usage, the present apparatus has significant utility and benefit.

Figure 3:
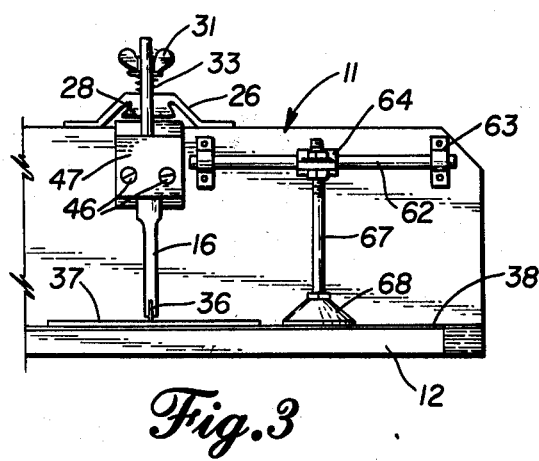
FIG. 3 is a partial front elevation thereof.

In order to further enhance the capabilities of the mechanical apparatus provided herein, additional attachments may be provided. An attachment that will facilitate the cutting of circles and regular curves is shown in FIGS. 1 and 3. In these FIGS. a slide bar 62 is mounted through use of brackets 63 on the inwardly disposed guide face 24 of the guide fence 14. A center pivot arm 64 is received for reciprocal movement along the slide bar 62, and, accordingly, such arm may be moved to adjusted positions. The arm provides an elongated slot 66, and a pivot bolt 67 of a center pivot assembly extends through such slot and can be moved to adjusted positions therealong. The pivot bolt shaft 67 provides rotatable support for a suction cup 68 that may be engaged directly to the face of a piece of glass that is to be cut. If the glass cutter 16 and its cutter wheel 36 are disposed at an angular position that is tangent to a circle defined by the pivot shaft 67, the suction cup 68 and the glass piece held thereby may be rotated to cut a circular score line on the glass. This arrangement can be used to cut stained and art glass pieces of circular or segment circular contour.

Since the apparatus is especially well adapted for stained glass and art glass operations, it is intended that the apparatus will be sold with patterns being provided for various stained glass designs. The patterns incorporate features which greatly facilitate use of the described apparatus. Features of a single pattern presentation and the uses thereof are illustrated in FIGS. 5 through 8. In FIG. 5 a layout for an intended stained glass presentation is shown. The front face of a representative fish design 71 is shown in FIG. 5. The design as it is to look when finished is printed on the front face 72 of the multi-faced pattern 71. The representation on the face 72 may be in full color with the separate segments of the design being of different color. The double line contours 73 that are printed on this front face are representative of the lead or cameing that will be applied to hold the separate segments together when the design is completed. If a full color representation is not provided, the separate segments may be numbered or otherwise identified, as exemplified by the numbers 74, 75 and 76 applied to this FIG. 5 representation. Desirably, the front face 72 of the design is provided on adhesive backed paper, and such front face 72 is applied to a separate back sheet 77 that is itself provided with an adhesive coating, with the adhesive of front and back faces initially in contact along the line 78 as shown in FIG. 4. When the design is to be executed by the user, the front and rear faces are separated, and the front face is applied to a mounting board or other support on which the separate segments and the joinder lead cameing may be placed as separate segments of glass are cut. The back face 77 has an obverse printed representation of the intended design. As in the prior instance, a double line representation 73a is used with the distance between lines corresponding to the thickness of the center section of the cameing that is to be used. The back face representation 77, after it is separated from the front face representation 72, can be applied to a flat faced cutting board, and thereafter a cutting knife 80 having paired cutting blades 79 that are spaced apart a distance corresponding to the distance between the lines 73a is used to cut separate segments from the overall design.

The double bladed knife 80 is illustrated while being used to cut the segment 76a from the overall back face or obverse representation 77. Since the initial design is of a native trout, the segment 76a could desirably be red. Accordingly, after the segment 76a has been severed from the overall back face representation, it, as a separate segment, will be applied to the back surface of a piece of red glass 81. The adhesive originally provided will again serve to hold the segment pattern 76a to this piece of glass. The obverse pattern representation of the back face 77 is provided since the glass ordinarily used in stained glass work has a relatively irregular front surface and a relatively flatter and smoother back face. Any disruptions and ridges in the contour of the glass necessarily makes it more difficult to provide the required cut or score lines through use of a glass cutter. Accordingly, it is desirable and more efficient to score and cut the back side rather than the front surface of stained glass pieces. When the pattern segment 76a is applied to the back surface of the glass, the entire piece of glass can be engaged beneath a glass cutting wheel. The glass itself is then moved through manipulation of the user's hand 82 or hands to score the glass along the guide line 83 provided by the pattern segment 76a. When the line 83 is being cut, a continuing score line 84 will be cut to the edge of the glass piece 81 in order to facilitate subsequent breakage of the glass along its score line 83.

When the score lines have been cut along all of the edges of the segment 76a, the glass can be broken to derive a segment piece that is of size and shape corresponding to the segment pattern 76a or 76. It should be noted that the same adhesive backing that initially holds the two pattern faces 72 and 77 together and which holds the obverse pattern 77 in place as the segments are being cut with the double bladed knife 80 is again useful in connection with glass breaking operations, since the adhesive can still be engaged with the back of the glass being separated to provide additional support for glass pieces as they are being broken.

Once the separate segment of glass defined by the obverse pattern segment 76a has been scored and broken, it will next be applied to the front pattern representation 72 at the segment piece 76 position. It will be held in this intended position by lead cameing that is applied to surround the piece. Such cameing will be placed in all positions initially indicated by the double lines 73 of pattern face 72. When all of the segment pieces of glass of various color and design have been cut and placed and when the lead has been soldered at all interrupted joints, field glass pieces may be cut that will surround the design representation as necessary to mount the finished design in a frame or other support.

While a pattern system that includes direct or front and obverse presentations has been shown and described, it is not always necessary to provide the obverse pattern layout. Many stained glass or art glass designs are essentially non-directional. For completion of such designs a single pattern representation could be used. Conversely, when lettering or numerals or other directionally oriented designs are to be accomplished, the described dual face pattern arrangement is preferred.

The double bladed knife 80 illustrated in FIG. 6 is of special utility when segment sections are to be separated from a general overall pattern layout. It has been noted, however, that when a thin film type of material is used for presentation of the pattern designs, it is not always necessary that the separate segments be severed from the overall pattern. In fact, it has been found that wheel type glass cutters can be used to cut directly through thin film patterns to score the glass segments that are to be separated. Further, and especially where a light source 89 is provided, the pattern can be applied to one surface of the glass, while score lines are cut on the opposite face thereof.

I claim:

1. Glass cutter apparatus to facilitate the by hand cutting of intricately shaped pieces of glass comprising a support table with a surface having a sufficient hardness, smoothness and durability to resist scratching by sharp edges of cut glass providing a low friction contact surface for a sheet of glass, a cutter support arm disposed in spaced position with respect to said table, glass cutter receiving means on said arm, a glass cutter providing a glass scoring element engaged and held by said receiving means with the scoring element thereof disposed for spring biased pressured contact with glass in place on said contact surface of said table, and force adjusting means including spring bias means for changing the spring biased force exerted by said cutter and the scoring element thereof on the glass to be scored, said combination inclusive of the low friction table contact surface being useful when the user of said cutter apparatus for easy movement of the glass around said contact surface, moves the glass that is to be cut with respect to the cutter and its scoring element whereby score lines are provided outlining the intended segment pieces.

2. The cutter apparatus as set forth in claim 1, wherein said force adjusting means is inclusive of threaded elements for changing the contact pressure to a preadjusted force on said glass cutter and said spring bias means maintains the preadjusted force.

3. The glass cutter apparatus as set forth in claim 1 wherein said glass cutter receiving means is pivotally mounted on said support arm whereby the glass cutter and its scoring element may be rotated to alternate angular positions with respect to said arm.

4. The cutter apparatus as set forth in claim 3 wherein said cutter receiving means is mounted for reciprocal movement with respect to said support arm whereby the lateral positioning of the cutter with respect to said arm may be changed.

5. The cutter apparatus as set forth in claim 4 wherein the reciprocal mounting means further facilitates the rotatable adjustment and positioning of said cutter receiving means.

6. The cutter apparatus as set forth in claim 4 wherein said support arm provides an elongated slot and said cutter receiving means is movable therealong, and further comprising a guide fence element on said table at a transverse position with respect to said support arm whereby the distance between said fence and said glass cutter is adjustable as the cutter receiving means is moved along said arm and its slot.

7. The cutter apparatus as set forth in claim 1 wherein a fulcrum support is provided for said support arm at position above the table and said force adjusting means tends to rotate said support arm about its fulcrum.

8. The cutter apparatus as set forth in claim 7, wherein said support arm is adapted for normal reciprocal movement with respect to said table, its fulcrum and its force adjusting means.

9. The cutter apparatus as set forth in claim 1 and further comprising a light source disposed in said table at a position beneath intended placement for said glass cutter and its scoring element whereby light is directed through the glass pieces being cut to illuminate the scoring element of said glass cutter and intended score lines.

10. The cutter apparatus as set forth in claim 1 and further comprising a pattern presentation of designs for segment pieces that are to be cut, said pattern presentation being inclusive of a front pattern sheet upon which the pattern is printed and adhesive backing therefor whereby the pattern may be applied to glass to be cut.

11. The cutter apparatus as set forth in claim 10 wherein the printed front pattern sheet is inclusive of double outline representations for indication of the intended score lines whereby the segment pieces cut from glass along the intended score lines will be spaced apart one from the other a distance corresponding to the thickness of connective elements that will later be used to join the glass segments into a total design pattern.

12. The cutter apparatus as set forth in claim 11 wherein said pattern sheet representation is printed on thin film plastics material, and a cutter wheel is provided as the scoring element for said cutter whereby the cutter wheel when coursed along intended score lines will cut through said thin film pattern representation itself to provide the intended score lines.

13. The cutter apparatus as set forth in claim 11 and further comprising an obverse pattern presentation adhesively joined to the front face pattern presentation with said front face and obverse pattern presentations being separable for separate use in connection with stained glass cutting activities with the obverse pattern presentations being applied to back surfaces of stained glass material to facilitate the cutting thereof.

14. The cutter apparatus as set forth in claim 13 wherein the front face presentation represents a layout pattern for a total stained glass design project and said obverse representation, accordingly, provides a pattern for the cutting of multiple segment pieces that are later positioned above the front face representation when completing a stained glass design project.

15. The cutter apparatus as set forth in claim 14 wherein the double line representations on said front face design presentation correspond to the thickness and placement of lead cameing materials that will be used to join the individual segment pieces together when the stained glass design project is completed.

16. Glass cutter apparatus to facilitate the byhand cutting of intricately shaped pieces of glass comprising a support table providing a low friction contact surface, a cutter support arm disposed in spaced position with respect to said table, a fulcrum support provided for said support arm at a position above said support table, glass cutter receiving means on said arm, a glass cutter providing a glass scoring element engaged and held by said receiving means with the scoring element thereof disposed for pressured contact with glass in place on said table, and force adjusting means tending to rotate and support arm about said fulcrum support for changing the force exerted by said cutter and the scoring element thereof on the glass to be scored, said support arm being adapted for reciprocal movement with respect to said table, its fulcrum and its force adjusting means, said combination inclusive of the low friction table contact surface being useful when the user of said cutter apparatus moves the glass that is to be cut with respect to the cutter and its scoring element whereby score lines are provided outlining the intended segment pieces, a guide fence element on said table at a transverse position with respect to said support arm whereby the distance between said fence and said glass cutter is adjustable as the cutter receiving means is moved reciprocally with said arm to further facilitate the cutting of straight score lines on said glass.

17. The cutter apparatus as set forth in claim 16, wherein said fulcrum and guide fence elements are disposed above said table and wherein guide slots for reception of said support arm are provided by said fulcrum and guide fence elements with the guide fence being disposed at 90° with respect to the axis of said arm whereby the cutting of score lines at 90° to an existing edge of the glass piece being cut is facilitated.

18. The cutter apparatus as set forth in claim 16, and further comprising components to facilitate the cutting of regular curves inclusive of a pivot support arm and glass engaging means adapted for rotation with respect to said pivot arm, said glass engaging means providing a turn center for rotation of the glass past the glass cutter and its scoring element mounted on said support arm.

* * * * *